United States Patent Office.

ETTORE DE FAZI, OF ROME, ITALY, ASSIGNOR TO A. PIATTI & CO., OF SAME PLACE.

MANUFACTURE OF GAS.

SPECIFICATION forming part of Letters Patent No. 641,444, dated January 16, 1900.

Application filed February 8, 1897. Serial No. 622,559. (No specimens.)

*To all whom it may concern:*

Be it known that I, ETTORE DE FAZI, a subject of the King of Italy, residing at 104 Via Nomentana, in the city of Rome, in the Kingdom of Italy, have invented certain new and useful Improvements in the Manufacture of Gas; and I do declare the following to be a full, clear, and exact description of the invention, such as will enable others skilled in the art to which it appertains to make and use the same.

The subject of the present invention concerns the production of a gas suitable for heating, machinery, and illumination from calcium carbid, calcium monoxid, and colophony.

When colophony is combined with unslaked lime and the latter is treated with water, the colophony will be commuted to gas when the slaking of the lime begins, if care is taken that the temperature is sufficiently high. This necessary elevation of temperature is obtained most advantageously by adding calcium carbid, which, as well known, yields a highly-illuminating gas when treated with water. As the gas resulting from lime and colophony has but a very small illuminating power, the addition of carbid is recommended on this special reason also. Aside from this method of rendering the gas illuminating by means of the acetylene gas generated, the addition of carbid has the primary purpose of heightening the temperature to the degree necessary for the generation of gas from lime and colophony. The explanation for the development of a sufficiently-high temperature will be found in the fact that calcium carbid and calcium monoxid produce in their combustion with water such an elevation of temperature that under certain conditions even heat it to a phase of incandescence. The carbid therefore adds to the gas-generating mass new calories, which procure gas generation in combination with the calories liberated in the slaking of the lime, so that a real distillation of the colophony takes place in the presence of alkali. While fifty grams of calcium carbid produce from ten to thirteen liters of acetylene gas, the present invention—*i, e.*, the employment of lime and colophony—generates from the same mass of carbid about fifty to sixty liters of a brightly-illuminating gas.

The following per cent. composition of the mixture has been found to yield the most favorable result: calcium monoxid, eighty parts; colophony, ten parts; calcium carbid, five parts.

The above proportion may be altered, in accordance with the requirements of practice, according to special proportions without interfering with the invention proper.

The gas generated from the mixture of calcium monoxid and colophony can be carbureted still more—*i. e.*, the illuminating power of the same can be enhanced by any of the usual carbureting processes by passing the gas through liquid carbureters, petroleum ether, benzene, and other hydrocarbons.

For the production of the above-described gas any kind of ordinary gas-generator, preferably those used for the generation of acetylene gas, may be employed.

An analysis has given the following results per liter of gas: Acetylene, ($C_2H_2$,) two hundred and seventy cubic centimeters; non-saturated hydrocarbons, ($CnH_2n$,) three hundred and ninety-two cubic centimeters; carbonic acid, ($CO_2$,) sixteen cubic centimeters; carbonic oxid, (CO,) 2.5 cubic centimeters; oxygen, (O,) five cubic centimeters; saturated hydrocarbons, ($CnH_2n+2$,) 314.5 cubic centimeters.

I claim—

The herein-described process consisting in mixing calcium monoxid, colophony and calcium carbid, and treating the mixture with water.

In witness whereof I have hereunto set my hand in presence of two witnesses.

ETTORE DE FAZI.

Witnesses:
G. W. GANARTH,
ROBERT B. HANDLEY.